Patented Aug. 3, 1937

2,089,150

UNITED STATES PATENT OFFICE 2,089,150

PROCESS OF PREPARING HORMONES OF SUPRARENAL CORTEX

Carl Ludwig Lautenschläger, Frankfort-on-the-Main, Heinz Öppinger, Hofheim (Taunus), Otto Schaumann, Wiesbaden, and Rudolf Rigler and Rudolf Fussänger, Frankfort-on-the-Main, Germany, assignors to Winthrop Chemical Company,, Inc., New York, N. Y., a corporation of New York No Drawing. Application March 1, 1934, Serial No. 713,606. In Germany November 10, 1932

11 Claims. (Cl. 167—77)

The present invention relates to a process of preparing hormones of suprarenal cortex.

As is known, the cortical substance of the suprarenal capsule and the preparations obtained therefrom contain considerable quantities of the medullary hormone 1-(3.4-dihydroxy-phenyl)-2-methylaminoethanol-1, besides the hormone of the suprarenal cortex. As the preparations of suprarenal cortex are used for therapeutic purposes, the dihydroxy-phenyl-methylaminoethanol has to be removed on account of its extremely strong physiological action. It has already been proposed to destroy the dihydroxy-phenyl-methylaminoethanol by oxidation, for instance with potassium permanganate or hydrogen peroxide; these processes are, however, onerous and connected with a great loss of the hormone of the suprarenal cortex.

We have now found that preparations of the cortical substance of the suprarenal capsule which are free from dihydroxy-phenyl-methylaminoethanol can be obtained in a simple manner by subjecting the suprarenal cortex per se or in form of its preparations (powder, extracts or the like) for a short time to the action of formaldehyde or compounds capable of splitting off formaldehyde, such as formaldehyde-bisulfite, formaldehyde-sulfoxylate, or the like. By this treatment the dihydroxy-phenyl-methylaminoethanol is transformed into a physiologically inactive condensation product of unknown constitution. This inactivation occurs in a medium of feebly alkaline, neutral or feebly acid reaction, but best and most quickly in a medium feebly alkaline with ammonia or with bicarbonate. The procedure may be, for instance as follows: a magma of suprarenal cortex is mixed with a small quantity of formaldehyde; the mixture is allowed to stand for some time and the excess of formaldehyde is then destroyed with ammonia. The product thus obtained can be worked up so as to produce a dry substance or some other preparation of suprarenal cortex. With the same success suprarenal cortex in the form of powder can be subjected to the process of the present application. In this case the procedure may be as follows: the powder is suspended in water so as to form a magma and the magma is treated with formaldehyde. It also suffices to expose the powder of the gland directly to the vapors of formaldehyde and after the removal of the last traces of formaldehyde with ammonia vapors and a subsequent extraction there are obtained extracts which are free from dihydroxy-phenyl-methylaminoethanol. The formaldehyde is preferably used in a moderate excess that is to say slightly more than 1 mol. of formaldehyde per mol. of dihydroxy-phenyl-methylaminoethanol contained in the cortical substance of the suprarenal capsule. It has been ascertained that under the conditions to be applied in the present process an excess of formaldehyde has no destructive action upon the hormone of the suprarenal capsule.

The duration of the reaction varies; in general the reaction lasts about 15 to 30 minutes with solutions and 2 to 3 hours with powders. Its end can be ascertained by examining whether the preparation has lost its property of raising the blood-pressure. The treatment may be carried out at room temperature.

When extracts of the cortical substance of the suprarenal capsule are under treatment, it is advisable to add the solution of formaldehyde only until all of the dihydroxy-phenyl-methylaminoethanol is just bound. A subsequent elimination of the excess of formaldehyde is thus avoided. Extracts of the cortical substance of the suprarenal capsule prepared by other known methods can be freed in the same manner from the dihydroxy-phenyl-methylaminoethanol without any loss of the efficacy.

It has been further ascertained that the process can be applied to the total suprarenal capsule because not only the dihydroxy-phenyl-methylaminoethanol contained in the cortical substance of the suprarenal capsule but the whole dihydroxy-phenyl-methylaminoethanol contained in the medulla is destroyed, that is to say is inactivated by the treatment with formaldehyde. The possibility of this step is extremely important in view of the fact that it is no longer necessary to separate the suprarenal cortex from the medulla.

Instead of formaldehyde compounds capable of splitting off formaldehyde, such as formaldehyde-bisulfite, formaldehyde-sulfoxylate, or the like may be used with like success.

It is surprising that it is possible to obtain by this invention preparations of the suprarenal cortex which are free from dihydroxy-phenyl-methylaminoethanol because the hormone of the suprarenal cortex is generally known to be a substance liable to decompose. Furthermore, it is known that formaldehyde reacts with albuminous substances so that it had to be expected that the formaldehyde would react first or for the most part with the albumin contained in a large proportion in the cortical substance of the suprarenal capsule.

The body produced from dihydroxy-phenyl-methylaminoethanol and formaldehyde is practically inactive. It, therefore, is a great progress in therapy that it is possible to make in a simple manner preparations of the suprarenal cortex which do not possess the toxic effect of the dihydroxy-phenyl-methylaminoethanol.

The preparations of the suprarenal cortex obtained according to the process may be further purified.

The following examples serve to illustrate the invention, but they are not intended to limit it thereto:

(1) 1 gram of dry powder of the suprarenal capsule containing 15 milligrams of dihydroxy-phenyl-methylaminoethanol is suspended in 10 cc. of water or alcohol of 80 per cent. strength and the suspension is rendered just alkaline by means of sodium bicarbonate. After the addition of 0.5 cc. of a formaldehyde solution of 2 per cent. strength the suspension is allowed to stand for about ½ to 1 hour, and is then centrifuged. 1 cc. of the solution thus obtained corresponding to an original content of 1.5 milligrams of dihydroxy-phenyl-methylaminoethanol does not cause the slightest raising of the blood pressure.

(2) 5 grams of dry powder of the suprarenal cortex are exposed in a closed vessel to the vapors of 2 to 3 cc. of an aqueous formaldehyde solution. After 30 to 60 minutes the formaldehyde solution is eliminated, the powder is subjected to a reduced pressure and the residual formaldehyde is bound by ammonia vapors. The powder is evacuated again to remove an excess of ammonia, then extracted with 50 cc. of Ringer solution and centrifuged. The solution thus obtained does not cause a raising of the blood pressure.

(3) 100 cc. of a press juice of the suprarenal capsule freed from albumin by ultrafiltration and having a total content of 500 milligrams of dihydroxy-phenyl-methylaminoethanol are rendered alkaline with sodium bicarbonate and mixed with 3 cc. of a formaldehyde solution of 3.5 per cent. strength. After the mixture has been allowed to stand for a short time, while stirring, the content of dihydroxy-phenyl-methylaminoethanol, measured by blood pressure, has nearly completely disappeared. The extract is rendered just acid to litmus paper by means of dilute hydrochloric acid and can then directly be used.

We claim:

1. In the process of preparing hormone of suprarenal cortex free from 1-(3.4-dihydroxy-phenyl)-2-methylaminoethanol-1 the step which comprises causing a substance of the group consisting of formaldehyde and formaldehyde-yielding compounds to act upon the suprarenal capsule.

2. In the process of preparing hormone of suprarenal cortex free from 1-(3.4-dihydroxy-phenyl)-2-methylaminoethanol-1 the steps which comprise causing an excess of a substance of the group consisting of formaldehyde and formaldehyde-yielding compounds to act upon the suprarenal capsule and then eliminating the excess of formaldehyde.

3. In the process of preparing hormone of suprarenal cortex free from 1-(3.4-dihydroxy-phenyl)-2-methylaminoethanol-1 the step which comprises causing a substance of the group consisting of formaldehyde and formaldehyde-yielding compounds to act upon the suprarenal capsule in a weakly alkaline solution.

4. In the process of preparing hormone of suprarenal cortex free from 1-(3.4-dihydroxy-phenyl)-2-methylaminoethanol-1 the steps which comprise causing an excess of a substance of the group consisting of formaldehyde and formaldehyde-yielding compounds to act upon the suprarenal capsule in a weakly alkaline solution and then eliminating the excess of formaldehyde.

5. In the process of preparing hormone of suprarenal cortex free from 1-(3.4-dihydroxy-phenyl)-2-methylaminoethanol-1 the step which comprises causing a substance of the group consisting of formaldehyde and formaldehyde-yielding compounds to act upon the suprarenal cortex containing, besides the hormone of suprarenal cortex, still 1-(3.4-dihydroxy-phenyl)-2-methylaminoethanol-1.

6. In the process of preparing hormone of suprarenal cortex free from 1-(3.4-dihydroxy-phenyl)-2-methylaminoethanol-1 the step which comprises causing a substance of the group consisting of formaldehyde and formaldehyde-yielding compounds to act in a weakly alkaline solution upon the suprarenal cortex containing, besides the hormone of suprarenal cortex, still 1-(3.4-dihydroxy-phenyl)-2-methylaminoethanol-1.

7. In the process of preparing hormone of suprarenal cortex free from 1-(3.4-dihydroxy-phenyl)-2-methylaminoethanol-1 the step which comprises causing a substance of the group consisting of formaldehyde and formaldehyde-yielding compounds to act in a weakly alkaline solution upon a purified preparation from suprarenal cortex containing, besides the hormone of suprarenal cortex still 1-(3.4-dihydroxy-phenyl)-2-methylaminoethanol-1.

8. In the process of preparing hormone of suprarenal cortex free from 1-(3.4-dihydroxy-phenyl)-2-methylaminoethanol-1 the step which comprises causing an aqueous solution of formaldehyde to act upon a weakly alkaline aqueous suspension of dry powder of the suprarenal capsule.

9. In the process of preparing hormone of suprarenal cortex free from 1-(3.4-dihydroxy-phenyl)-2-methylaminoethanol-1 the step which comprises causing gaseous formaldehyde in excess to act upon the dry powder of suprarenal cortex containing said hormone and 1-(3.4-dihydroxy-phenyl)-2-methylaminoethanol-1 and then rendering ineffective the excess of formaldehyde by causing gaseous ammonia to act upon the dry powder of the suprarenal cortex.

10. In the process of preparing hormone of suprarenal cortex free from 1-(3.4-dihydroxy-phenyl)-2-methylaminoethanol-1 the step which comprises causing an aqueous solution of formaldehyde to act upon albumin-free press juice of suprarenal capsule rendered weakly alkaline.

11. Process of preparing the hormone of the suprarenal cortex free from 1-(3.4-dihydroxy-phenyl)-2-methylaminoethanol-1, which comprises treating a powder comprising the suprarenal cortex containing said hormone and said 1-(3.4-dihydroxy-phenyl)-2-methylaminoethanol-1 in a weakly alkaline medium with formaldehyde in quantity slightly in excess of 1 mol. of formaldehyde per mol. of said 1-(3.4-dihydroxyphenyl)-2-methylaminoethanol-1 and then rendering ineffective the excess of formaldehyde by introducing ammonia into the reaction mixture.

CARL LUDWIG LAUTENSCHLÄGER.
HEINZ ÖPPINGER.
OTTO SCHAUMANN.
RUDOLF RIGLER.
RUDOLF FUSSGÄNGER.